US010613055B2

(12) United States Patent
Covey et al.

(10) Patent No.: US 10,613,055 B2
(45) Date of Patent: Apr. 7, 2020

(54) SYSTEMS AND METHODS FOR MULTI-CHANNEL DIFFERENTIAL MOBILITY SPECTROMETRY

(71) Applicant: DH Technologies Development Pte. Ltd., Singapore (SG)

(72) Inventors: Thomas Covey, Newmarket (CA); Yang Kang, Richmond Hill (CA); Chang Liu, Thornhill (CA); Bradley Schneider, Bradford (CA)

(73) Assignee: DH Technologies Development Pte. Ltd., Singapore (SG)

(*) Notice: Subject to any disclaimer, the term of this patent is extended or adjusted under 35 U.S.C. 154(b) by 0 days.

(21) Appl. No.: 16/085,239

(22) PCT Filed: Mar. 15, 2017

(86) PCT No.: PCT/IB2017/051509
§ 371 (c)(1),
(2) Date: Sep. 14, 2018

(87) PCT Pub. No.: WO2017/158534
PCT Pub. Date: Sep. 21, 2017

(65) Prior Publication Data
US 2019/0086363 A1    Mar. 21, 2019

Related U.S. Application Data

(60) Provisional application No. 62/308,815, filed on Mar. 15, 2016.

(51) Int. Cl.
*G01N 27/00* (2006.01)
*G01N 27/62* (2006.01)
*H01J 49/06* (2006.01)

(52) U.S. Cl.
CPC .......... *G01N 27/624* (2013.01); *H01J 49/067* (2013.01)

(58) Field of Classification Search
CPC ............................ G01N 27/624; H01J 49/067
(Continued)

(56) References Cited

U.S. PATENT DOCUMENTS

2008/0067350 A1* 3/2008 Li ........................ G01N 27/624
250/287
2008/0149824 A1* 6/2008 Miller .................. G01N 27/624
250/287

(Continued)

FOREIGN PATENT DOCUMENTS

WO    2014203071 A1    12/2014

OTHER PUBLICATIONS

International Search Report and Written Opinion for PCT/IB2017/051509 dated Jun. 12, 2017.

*Primary Examiner* — Michael Maskell

(57) ABSTRACT

In accordance with various aspects of the present teachings, methods and systems for differential mobility spectrometry are provided herein for simultaneously applying a plurality of SV/CV combinations to subsets of a population of ions generated by one or more ion sources. In various aspects, DMS devices in accordance with the present teachings can provide multiple channels (e.g., 2, 3, 4, 5, 6, or more) for operating in parallel and within which different electrical fields can be generated for filtering sample ions within those channels based on the characteristic mobilities of the ions within each channel. In this manner, devices and methods in accordance with the present teachings can, in various aspects, enable improved duty cycle, increased throughput, decreased sample consumption, increased sensitivity for a plurality of ions of interest, and/or increased resolution.

14 Claims, 7 Drawing Sheets

(58) Field of Classification Search
USPC .............. 250/281, 282, 287, 288, 292, 293
See application file for complete search history.

(56) References Cited

U.S. PATENT DOCUMENTS

| | | |
|---|---|---|
| 2011/0101214 A1 | 5/2011 | Miller et al. |
| 2011/0266432 A1* | 11/2011 | Ugarov ................ H01J 49/067 250/282 |
| 2013/0180693 A1 | 7/2013 | Giannakopulos |
| 2013/0180893 A1* | 7/2013 | Giannakopulos .... G01N 27/624 209/127.1 |

* cited by examiner

SYSTEMS AND METHODS FOR MULTI-CHANNEL DIFFERENTIAL MOBILITY SPECTROMETRY

RELATED APPLICATIONS

This application claims the benefit of priority from U.S. Provisional Application Ser. No. 62/308,815 filed on Mar. 15, 2016, the entire contents of which is hereby incorporated by reference.

FIELD

The teachings herein relate to mass spectrometry, and more particularly to methods and apparatus for differential mobility spectrometry.

BACKGROUND

Differential Mobility Spectrometers (DMS), also referred to as a Field Asymmetric Waveform Ion Mobility Spectrometers (FAIMS) or Field Ion Spectrometers (FIS), typically perform gas-phase ion sample separation and analysis by continuously transmitting ions-of-interest while filtering out unwanted species. In some circumstances, a DMS can be interfaced with a mass spectrometer (MS) to take advantage of the atmospheric pressure, gas-phase, and continuous ion separation capabilities of the DMS and the detection accuracy of the MS. By interfacing a DMS with an MS, numerous areas of sample analysis, including proteomics, peptide/protein conformation, pharmacokinetics, and metabolism analysis have been enhanced. In addition to pharmaceutical and biotech applications, DMS-based analyzers have been used for trace level explosives detection and petroleum monitoring.

A DMS, like an ion mobility spectrometer (IMS), is considered an ion mobility based analyzer because the DMS separates and analyzes ions based on the mobility characteristics of the ions rather than based on the mass-to-charge ratio as in MS. Specifically in DMS, ions within a drift gas can be continuously pulsed or transmitted into a drift tube or gap between two parallel electrodes that generate an asymmetric electric field (S or separation field) therebetween that tends to move the ions in a direction perpendicular to the direction of the drift gas flow (i.e., toward the electrodes). The asymmetric field (S) can be generated by applying an electrical signal(s) to one or more of the electrodes so as to generate an asymmetric waveform, the amplitude of which is referred to as the separation voltage (SV). Typically, the asymmetric field S exhibits a high field duration at one polarity and then a low field duration at an opposite polarity, with the durations of the high field and low field portions set such that the net electrical force on the ions in a direction perpendicular to the direction of the gas flow (i.e., in the direction of the electrodes) over each period is zero during each cycle of the SV. Because a particular ion's mobility through the drift gas during the high and low field portions of the SV can be a function of each particular ion's size, shape, and charge state (and its interactions with the background gas), the various ions' flight paths through the DMS can deviate from the center of the chamber toward the electrodes as the ion drifts therebetween unless the ions' trajectories are corrected by a counterbalancing force. In DMS, this counterbalancing force is typically provided by a DC compensation field (C), in which a DC voltage difference between the electrodes (compensation voltage, CV) can restore a stable trajectory for a subset of the ions, thereby allowing these ions to be transmitted from the DMS. In this manner, the CV can be set to a fixed value corresponding to the optimum transmission of an ion of interest (e.g., based on theoretical calculations or empirical data) such that the ions of interest and other ion species exhibiting a stable trajectory within the differential mobility field (e.g., the field at that SV/CV combination) are transmitted by the DMS, while non-desired, unstable ions are neutralized at the electrodes. Rather than maintain a fixed combination of SV/CV throughout the sample run, conventional DMS systems can be operated by varying the strength of the SV and/or the CV over time (e.g., by scanning the CV to increase its magnitude during a sample run, by providing stepwise increases to CV) so as to iteratively transmit ions of different characteristic mobilities at each particular SV/CV combination.

Because conventional DMS methods and devices only enable a single SV/CV combination to be applied at a given time, known DMS techniques can require more sample runs (e.g., sample injections) to be performed in order to apply the various SV/CV pairs, thereby reducing sample throughput and/or increasing sample consumption. Though conventional DMS devices can alternatively be operated by varying the SV and/or CV over time so as to iteratively transmit ions of different mobilities during a single sample run, such methods can nonetheless result in increased sample consumption, as well as duty cycle loss and/or increased data acquisition times due to the time required to switch the CV value (typically on the order of about 20 ms). Conventional DMS devices could alternatively be operated at sub-optimal conditions so as to ensure transmission of ion species having different characteristic mobilities. By way of example, conventional DMS devices could be operated at a SV/CV pair such that each of two ions of interest are transmitted, with neither being at its theoretical or empirical optimum CV apex corresponding to its maximum transmission. Alternatively, the residence time of the ions within the DMS can be decreased (e.g., by increasing the rate of the drift gas) such that more ions exhibit a stable trajectory at each SV/CV pair due to the decreased residence time in the asymmetric field. Such sub-optimal methods, however, can result in decreased sensitivity, decreased resolution, and/or the increased transmission of undesired ions.

Accordingly, a need exists for improved differential mobility spectrometers and methods of operating the same.

SUMMARY

In accordance with various aspects of the present teachings, methods and systems are provided herein for simultaneously applying a plurality of SV/CV combinations to subsets of a population of ions generated by one or more ion sources. In various aspects, DMS devices in accordance with the present teachings can provide multiple channels (e.g., 2, 3, 4, 5, 6, or more) for operating in parallel and within which different differential mobility fields can be generated for filtering sample ions within those channels based on the characteristic mobilities of the ions within each channel. In this manner, devices and methods in accordance with the present teachings can, in various aspects, enable improved duty cycle, increased throughput, decreased sample consumption, increased sensitivity for a plurality of ions of interest, and/or increased resolution.

In accordance with various aspects of the present teachings, a differential mobility spectrometer is provided that comprises a plurality of electrodes extending from an inlet end for receiving sample ions contained within a drift gas to an outlet end for transmitting selected portions of the sample ions therefrom based on the mobility characteristics thereof, wherein said plurality of electrodes comprise: a first pair of opposed filter electrodes extending from the inlet end to the outlet end and configured to receive a first portion of the sample ions therebetween, wherein the first pair of opposed filter electrodes is configured to be electrically coupled to a power supply so as to generate a first differential mobility electric field between the first pair of opposed filter electrodes; and a second pair of opposed filter electrodes extending from the inlet end to the outlet end and configured to receive a second portion of the sample ions therebetween, wherein the second pair of opposed filter electrodes is configured to be electrically coupled to the power supply so as to generate a second differential mobility electric field between the second pair of opposed filter electrodes. The first differential mobility electric field and the second differential mobility electric field can be configured to be different from one another (e.g., by having different combinations of SV/CV generated by the associated electrodes) so as to selectively and simultaneously transmit from the first pair of electrodes and the second pair of electrodes species of ions exhibiting different mobility characteristics. By way of example, the first and second differential mobility fields can be configured such that the first and second pair of electrodes transmit to the outlet end selected species of the first and second portions of the sample ions having different mobility characteristics. In some embodiments, the first and second portions of the sample ions have the same polarity.

In various aspects, the power supply can be configured to provide electrical signals to each of the opposed filter electrodes of each of the first and second pair such that each of the first and second differential mobility electric fields comprise the combination of an asymmetric separation field (S) and a DC compensation field (C). By way of example, the first and second differential mobility electric fields can vary in the combination of the asymmetric separation field S and the DC compensation field C (e.g., by selecting different combinations of SV and CV, by changing the gap height between the electrode pairs, or by changing the gas number density or pressure between the electrode pairs). For example, the first and second differential mobility electric fields can differ from one another in at least one of the asymmetric separation field and the DC compensation field. That is, in some aspects, the first differential mobility electric field can comprise a first asymmetric separation field ($S_1$) and a first DC compensation field ($C_1$) and the second differential mobility electric field can comprise a second asymmetric separation field ($S_2$) and a second DC compensation field ($C_2$), wherein at least one of: i) $S_1$ is different from $S_2$, and ii) $C_1$ is different from $C_2$. It will be appreciated in light of the present teachings that differences in $S_1$ and $S_2$ can result from the application of different DC separation voltages (SV) between the electrode pairs ($SV_1$ and $SV_2$), or by maintaining the same $SV_1$ and $SV_2$ and varying either the gap height or pressure within a given channel. It will also be appreciated in light of the present teachings that differences in $C_1$ and $C_2$ can result from the application of different compensation voltages ($CV_1$ and $CV_2$) and/or by varying the gap height. In some aspects of the present teachings, the power supply (comprising one or more power sources) can be controlled (e.g., via a controller) to change the electrical signals provided to the DMS such that the SV/CV combination applied between one or more pairs of electrodes are identical to one another (e.g., such that the differential mobility electric fields are the same between the first and second pair of electrodes, $S_1$ is equal to $S_2$ and $C_1$ is equal to $C_2$). By way of example, before or after simultaneously generating first and second different differential mobility electric fields between the electrodes of each electrode pair for a certain duration (e.g., so as to transmit different subsets of the species from the portion of sample ions between the electrode pairs), the electrical signals applied to the filter electrodes can be switched such that some or all of the filter electrode pairs simultaneously transmit the same species of the sample ions. It will be appreciated that in such aspects, the DMS in accordance with various aspects of the present teachings can be configured to operate in the manner of a conventional DMS in which a single SV/CV combination is applied because all sample ions entering the inlet end of the multi-channel DMS would be subject to identical S and C fields (e.g., identical SV/CV combinations with identical gap heights between the first pair of filter electrodes and the second pair of filter electrodes ($d_1=d_2$) and pressures within the first pair of filter electrodes and the second pair of filter electrodes ($P_1=P_2$) during transmission through each parallel channel.

In various aspects, the first and second differential mobility fields can comprise identical asymmetric separations fields (S's) and different DC compensation fields (C's). Alternatively, in some aspects, the first and second differential mobility fields can comprise identical DC compensation fields (C's) and different asymmetric separations fields (S's). In some aspects, both the asymmetric separation fields and the DC compensation fields can each differ between each electrode pair. For example, in some related aspects in which a plurality of SV/CV combinations can be applied to generate the plurality of differential mobility electric fields, the first and second differential mobility electric fields can be generated by providing SVs of the same magnitude and CVs of different magnitude between the electrodes of the respective electrode pair. Alternatively or additionally, in some aspect the first and second differential mobility electric fields can be generated by providing CVs of the same magnitude and SVs of different magnitude between the electrodes of the respective electrode pair. By way of example, CVs can be generated by maintaining a DC voltage differential between the opposed filter electrodes of each of the first and second pair. SVs, on the other hand, can be generated by applying an asymmetric electrical signal to at least one of the opposed filter electrodes of each pair. For example, a first asymmetric electrical signal can be applied to one of the opposed filter electrodes of each pair and a second different asymmetric electrical signal can be applied to the other of the opposed filter electrodes of each pair. In various related aspects, the CV between the opposed filter electrodes of the first pair can be different from the CV between the opposed filter electrodes of the second pair, which can thereby result in a different C between the electrodes of each pair. In such aspects, the SV between the electrodes of each pair can optionally remain identical in magnitude at each point in time. In other related aspects, the different asymmetric electrical signals applied to the opposed electrodes of each pair can comprise RF signals differing in one or more of magnitude, frequency, and phase. In some aspects, for example, the S generated between one pair of electrodes can differ from the S generated between the other pair by applying asymmetric electrical signals to the electrodes such that the magnitude of the SV between one pair is greater than the magnitude of the SV between the other pair. In such aspects, the CV between the electrodes of each pair can optionally remain identical in magnitude at each point in time.

In accordance with various aspects of the present teachings, the first and second pair of opposed filter electrodes can define first and second channels extending along the length of the plurality of electrodes, wherein the first differential mobility electric field is generated in the first channel and the second differential mobility electric field is generated in the second channel, with each channel able to be configured to transmit ions of a selected mobility based on the generation of different CV/SV combinations between the electrodes associated with that channel. In various aspects, for example, the channels can be separated by a filter electrode that partially defines one or both of the channels, by a non-conductive or conductive portion extending between the first and second electrode pairs, or by the first and second electric fields themselves (e.g., without any physical structure between the two channels). In some embodiments, the the first channel is isolated and/or separated from the second channel.

In accordance with various aspects of the present teachings, each filter electrode can comprise a planar conductive surface partially defining at least one of the channels, wherein the planar conductive surfaces of the electrodes in each pair are parallel to one another. In some aspects, the planar conductive surface of each electrode of the first and second pair can be coplanar with the planar conductive surface of an electrode in the other of said first and second pairs, and can be configured in some aspects such that the coplanar conductive surfaces of the electrodes are electrically isolated from one another. Alternatively, in some aspects, the planar conductive surface of each filter electrode can be parallel to the planar conductive surfaces of the other filter electrodes. By way of example, in related aspects the first and second channels can be separated by a filter electrode shared between the first and second pair, wherein the shared filter electrode comprises two parallel conductive surfaces, each of which partially defines one of the first and second channels.

Differential mobility spectrometers in accordance with the present teachings are not limited to two pairs of electrodes and/or two channels. By way of non-limiting example, the DMS can be configured to have 3, 4, 5, 6, or more opposed electrode pairs (and channels extending therebetween) in accordance with the present teachings. In some aspects, for example, the differential mobility spectrometer can additionally include a third pair of opposed filter electrodes extending from the inlet end to the outlet end, wherein the third pair of opposed filter electrodes is configured to be electrically coupled to the power supply so as to generate a third differential mobility electric field between the third pair of opposed filter electrodes. In some related aspects, for example, at least two electrodes of the first, second, and third pair of electrodes can be shared between pairs, with each pair defining a channel and such that the channels are stacked between the electrodes. Alternatively, in some aspects, each filter electrode can comprise a planar conductive surface parallel to the planar conductive surface of the other electrode in its pair, wherein the planar conductive surface of each electrode of the first, second, and third pair is coplanar with the planar conductive surface of an electrode in the other of said first, second, and third pair. In such aspects, insulating separators disposed between the electrodes of each pair can electrically isolate each pair from another, and can in some aspects, extend across the space defined between the coplanar conductive surfaces of the first, second, and third pairs.

In accordance with various aspects of the present teachings, a mass spectrometer system is provided comprising an ion source configured to generate a plurality of sample ions; a differential mobility spectrometer; a mass analyzer disposed downstream from the differential mobility spectrometer and configured to analyze the ions transmitted thereby; a detector; a power system comprising one or more power supplies electrically coupled to the differential mobility spectrometer; and a controller for controlling said one or more power supplies so as to generate first and second differential mobility electric fields between pairs of opposed filter electrodes of the differential mobility spectrometer, wherein the first differential mobility electric field and the second differential mobility electric field are different so as to selectively transmit a plurality of selected portions (e.g., species) of the sample ions based on the mobility characteristics thereof.

In accordance with various aspects of the present teachings, a method of analyzing ions is provided, the method comprising simultaneously generating first and second differential mobility electric fields between pairs of opposed filter electrodes of a differential mobility spectrometer so to selectively transmit in parallel a plurality of selected portions (e.g., species) of the sample ions based on the mobility characteristics thereof.

These and other features of the applicant's teachings are set forth herein.

BRIEF DESCRIPTION OF THE DRAWINGS

The skilled person in the art will understand that the drawings, described below, are for illustration purposes only. The drawings are not intended to limit the scope of the applicant's teachings in any way.

DETAILED DESCRIPTION

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly it will be apparent that the described embodiments may be susceptible to alteration or variation according to common general knowledge without departing from the scope of the disclosure. The following detailed description of embodiments is not to be regarded as limiting the scope of the applicant's teachings in any manner.

In various aspects, methods and systems are provided herein for differential mobility spectrometry in which subsets of sample ions transmitted into the differential mobility spectrometer from an ion source can be subjected to different differential mobility electrical field combinations so as to simultaneously filter selected subsets of the sample ions based on their characteristic ion mobilities under the particular SV/CV conditions to which the subsets of ions are subjected. In various aspects, DMS devices in accordance with the present teachings can provide a plurality of parallel channels (e.g., 2, 3, 4, 5, 6, or more), each of which can differentially filter the ions received from the ion source based on the different differential mobility electrical fields generated within each channel. In various aspects, devices and methods in accordance with the present teachings can provide i) improved duty cycle by eliminating the need to switch the CV or SV during a particular sample run, ii) increased throughput by reducing the data acquisition time, iii) decreased sample consumption by reducing the length of the sample injection, iv) increased sensitivity and/or resolution by operating the DMS channels at more optimal conditions for each particular ion species of a plurality of ion species of interest having different mobility characteristics.

Figure 1:
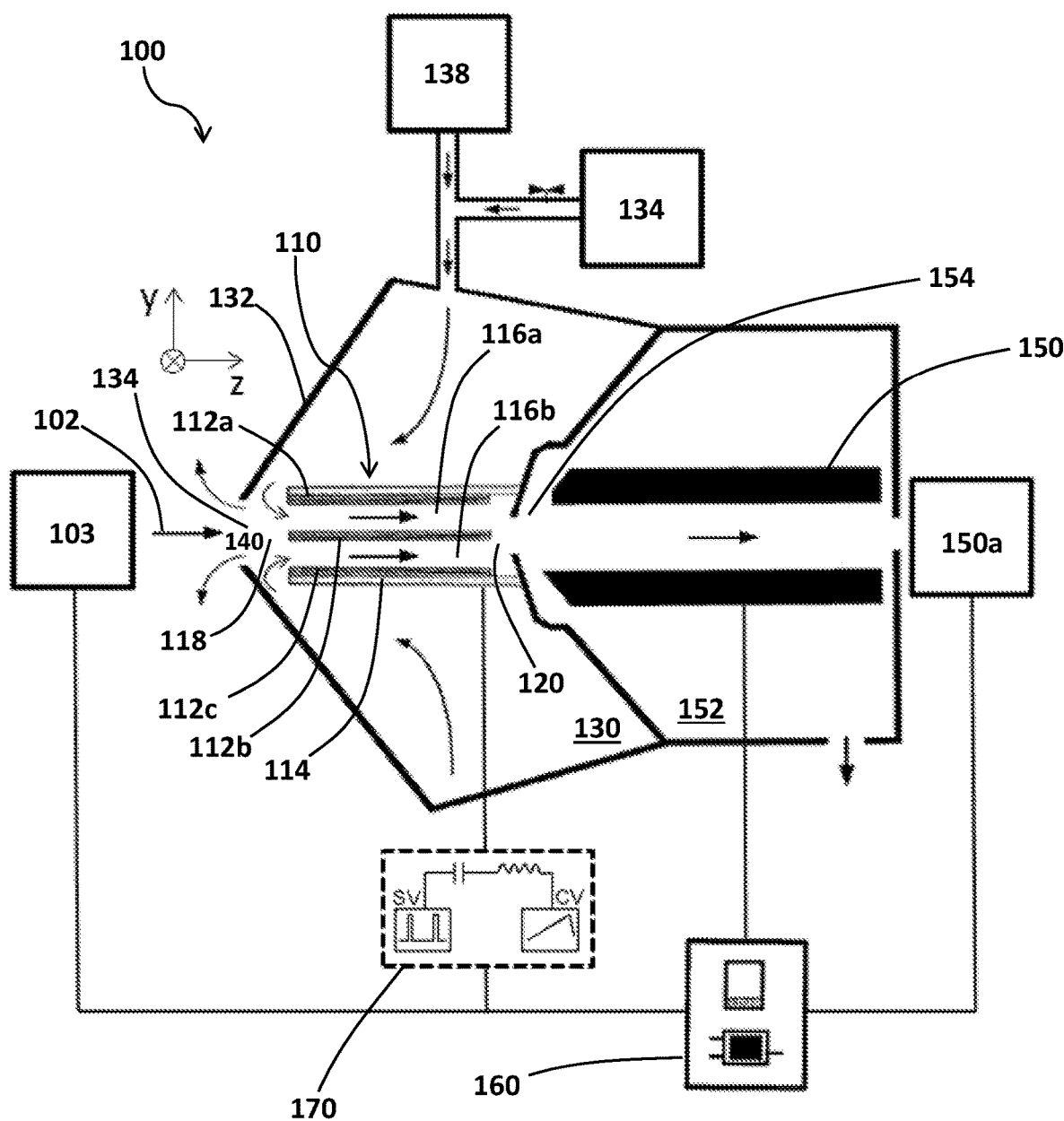
FIG. 1, in a schematic diagram, illustrates an exemplary mass spectrometer system incorporating a multi-channel differential mobility spectrometer in accordance with various aspects of embodiments of the applicant's teachings.

With reference now to FIG. 1, an exemplary differential mobility spectrometer/mass spectrometer system 100 in accordance with various aspects of applicant's teachings is illustrated schematically in a side cross-sectional view. As shown in FIG. 1, the differential mobility spectrometer/mass spectrometer system 100 generally comprises an ion source 103, a differential mobility spectrometer (DMS) 110, a first vacuum lens element 150 of a mass spectrometer (hereinafter generally designated mass spectrometer 150) in fluid communication with the DMS 110, and a controller 160 operatively coupled to the ion source 103, the DMS 110, and the mass spectrometer 150 for controlling operation of the system 100 as discussed otherwise herein.

In the exemplary embodiment depicted in FIG. 1, the differential mobility spectrometer 110 includes three filter electrodes 112a-c surrounded by an electrical insulator 114 that supports the filter electrodes 112a-c to insulate them from other conductive elements. As shown in FIG. 1, the three filter electrodes 112a-c are spaced apart from one another (i.e., separated on the y-axis) so as to define two channels 116a,b therebetween, each of which surrounds a drift gas (as indicated by the arrows in channels 116a,b) that can drift from an inlet 118 of the differential mobility spectrometer 110 to an outlet 120 of the differential mobility spectrometer 110. As depicted, each channel (eg. 116a) can be separated or isolated from the other channel (116b) to prevent gas flow and/or ions from exchanging between channels. The outlet 120 of the differential mobility spectrometer 110 releases the drift gas into an inlet 154 of a vacuum chamber 152 containing the mass spectrometer 150.

As will be appreciated by a person skilled in the art, the differential mobility spectrometer/mass spectrometer system 100 represents only one possible configuration for use in accordance with various aspects of the systems, devices, and methods described herein. By way of non-limiting example, the differential mobility spectrometer 110 can be a differential mobility spectrometer, or FAIMS devices of various geometries such as parallel plate, curved electrode, or cylindrical FAIMS device, among others and modified in accordance with the present teachings.

As shown in FIG. 1, the differential mobility spectrometer 110 can be contained within a curtain chamber 130 that is defined by a curtain plate or boundary member 132 and is supplied with a curtain gas from a curtain gas supply 134. A curtain plate orifice 140 allows the introduction of ions from the ion source 103 into the curtain chamber 130 and inlet 118 of the differential mobility spectrometer. The curtain plate orifice 140 at least partially overlaps the entrance of each channel (116a,116b) to allow ions to enter each channel freely. The pressure of the curtain gases in the curtain chamber 130 can be maintained at or near atmospheric pressure (i.e., 760 Torr). It will be appreciated by a person skilled in the art that the curtain gas supply 134 can provide any pure or mixed composition curtain gas to the curtain gas chamber via curtain gas conduits at flow rates determined by a flow controller and valves, for example. By way of non-limiting example, the curtain gas can be air, $O_2$, He, $N_2$, $CO_2$, or any combination thereof. As shown in FIG. 1, the system 100 can also include a modifier supply 138 for supplying a modifier to the curtain gas. Without being bound by any particular theory, the addition of modifier agents to the curtain gas can enable the ions to differentially cluster during the high and low field portions of the asymmetric separation field (S), which can affect the ability to resolve the ion of interest. As will be appreciated by a person skilled in the art, the modifier supply can be a reservoir of a solid, liquid, or gas through which the curtain gas is delivered to the curtain chamber 130. By way of example, the curtain gas can be bubbled through a liquid modifier supply. Alternatively, a modifier liquid or gas can be metered into the curtain gas, for example, through an LC pump, syringe pump, or other dispensing device for dispensing the modifier into the curtain gas at a known rate. For example, the modifier can be introduced using a pump so as to provide a selected concentration of the modifier in the curtain gas. The modifier supply 138 can provide any modifier including, by way of non-limiting example, acetone, water, methanol, acetonitrile, ethyl acetate, isopropanol, methylene chloride, methylene bromide, DMSO, or any combination thereof. Optionally, the curtain gas conduit and/or curtain chamber 130 can include a heater for heating the mixture of the curtain gas and the modifier to further control the proportion of modifier in the curtain gas and ensure proper vaporization.

As will be appreciated by a person skilled in the art, the differential mobility spectrometer/mass spectrometer system 100 can additionally include one or more additional mass analyzer elements 150a downstream from vacuum chamber 152. By way of example, ions can be transported through vacuum chamber 152 and through one or more additional differentially pumped vacuum stages containing one or more mass analyzer elements 150a. For instance, in one embodiment, a triple quadrupole mass spectrometer may comprise three differentially pumped vacuum stages downstream from the DMS 110, including a first stage maintained at a pressure of approximately 2.3 Torr, a second stage maintained at a pressure of approximately 6 mTorr, and a third stage maintained at a pressure of approximately $10^{-5}$ Torr. The third vacuum stage can contain a detector, as well as two quadrupole mass analyzers with a collision cell (Q2) located between them. In some aspects, for example, the collision cell (Q2) can be operated as a fragmentor for fragmenting the ions transmitted by the differential mobility spectrometer 110, with the detector 150a being configured to detect the ion species of interest by detecting one or more fragments of the ion species of interest. It will be apparent to those skilled in the art that there may be a number of other ion optical elements in the system. Other types of mass analyzer such as single quadrupole, ion trap (3D or 2D), hybrid analyzer (quadrupole-time of flight, quadrupole-linear ion trap, quadrupole-orbitrap), orbitrap or time-of-flight mass spectrometer, could also be used.

Ions 102 can be provided from an ion source 103 and emitted into the curtain chamber 130 via curtain chamber inlet 134 and enter the channels 116a,b, based for example on the distribution of ions and their initial displacement from the central axis (along the z-axis) of the curtain chamber inlet 134. As will be appreciated by a person skilled in the art, the ion source can be virtually any ion source known in the art, including for example, a continuous ion source, a pulsed ion source, an atmospheric pressure chemical ionization (APCI) source, an electrospray ionization (ESI) source, an inductively coupled plasma (ICP) ion source, a matrix-assisted laser desorption/ionization (MALDI) ion source, a glow discharge ion source, an electron impact ion source, a chemical ionization source, or a photoionization ion source, among others. The pressure of the curtain gases in the curtain chamber 130 (e.g., ~760 Torr) can provide both a curtain gas outflow out of curtain gas chamber inlet 134, as well as a curtain gas inflow into the various channels 116a,b of the differential mobility spectrometer 110, which inflow becomes the drift gas that carries the ions 102 through the differential mobility spectrometer 110 and into the mass spectrometer 150 contained within the vacuum chamber 152, which can be maintained at a much lower pressure than the curtain chamber 130. For example, the vacuum chamber 152 can be maintained at a pressure of 2.3 Torr by a vacuum pump. As the curtain gas within the curtain chamber 130 can include a modifier, the drift gas can also comprise a modifier. It will be appreciated that one or more additional chambers may be present between the exit of the DMS 110 and the mass spectrometer inlet 154.

As discussed otherwise herein, the electrodes 112a-c can be coupled to a power supply 170 comprising one or more power sources for generating electrical signals to be applied to the electrodes 112a-c. As shown schematically in FIG. 1, for example, the power supply 170 can comprise one or more power sources for generating a differential mobility field between the respective electrode pairs 112a,b and 112b,c within each of the channels 116a,b, the differential mobility field comprising the combination of an asymmetric separation field S and a DC compensation field C generated based on the electrical signals applied to the electrodes 112a-c. By way of example, the asymmetric separation field S can be generated by applying an electrical signal(s) to one or more of the electrodes 112a-c so as to generate an asymmetric waveform, the amplitude of which is referred to as the separation voltage or SV, which can be effective to generate an electric force in each respective channel 116a,b in the y-direction perpendicular to that of the drift gas flow (i.e., along the z-axis). It will be appreciated that the asymmetric separation field S generated by the electrical signals applied to the electrodes 112a-c can have a variety of forms, but typically is configured such that the asymmetric field exhibits a high field duration at one polarity and then a low field duration at an opposite polarity, with the durations of the high field and low field portions being set such that the net electrical force in a direction perpendicular to the direction of the gas flow (i.e., in the direction of the electrodes) over each period of S is zero.

With exemplary reference to the electrode pair 112a,b associated with the upper channel 116a, exemplary asymmetric signals include, for example, an AC signal (e.g., an RF signal) of a first amplitude at a first frequency applied to the electrode 112a and an AC signal (e.g., an RF signal) of a second amplitude at a second frequency applied to the electrode 112b. In some exemplary aspects, the first amplitude can be twice the second amplitude, while the first frequency is half the second frequency. It will be appreciated, however, that the electrical signals need not be sinusoidal but instead can exhibit any asymmetry configured to provide zero net electric force in a ±y-direction during each period of the S. By way of example, the asymmetric separation field S can be generated to be in the form of a square waveform by alternately applying DC voltages to electrodes 112a,b. By way of example, a positive DC voltage of a first magnitude can be applied to electrode 112a for a first duration (e.g., while the second electrode 112b is grounded) such that positive ions are repulsed from electrode 112a during the first duration (i.e., move toward electrode 112b). Thereafter, a positive DC potential of a different second magnitude can be applied to the second electrode 112b for a different second duration (while the first electrode can be grounded) such that positive ions are repulsed from electrode 112b during the second duration (i.e., move toward electrode 112a). The DC potentials and durations of the asymmetric separation field can be selected such that the average magnitude of the DC voltages applied to the electrode pair 112a,b over the first and second duration is 0 V DC. It will be appreciated that a similar asymmetric separation field S can also be generated by maintaining one of the electrodes (e.g., electrode 112b) at a fixed DC potential (e.g., ground) while applying a square wave electrical signal to the other electrode (e.g., electrode 112a), the square wave signal exhibiting a positive DC voltage of the first magnitude for the first duration and then a negative DC potential of the second magnitude for the second duration, by way of non-limiting example. Though the net electrical force on the ions in the ±y-direction of FIG. 1 over each period of the S is zero, ions contained within the drift gas within the channel 116a will nonetheless tend to migrate toward the electrodes (i.e., in the ±y-direction, perpendicular to the drift gas flow in the z-direction) of the channel 116a by a characteristic amount during each period of the asymmetric separation field S due to differences in the ion's mobility during the high field and low field portions.

As shown in FIG. 1, the power supply 170 can also contain one or more DC power sources for applying one or more DC potentials to the electrodes 112a-c so as to generate a DC compensation field (referred to herein as C) for providing a counterbalancing electrostatic force to that of the asymmetric separation field S in each channel 116a,b. As noted herein and will be appreciated by a person skilled in the art in light of the present teachings, the DC compensation field C can be selected so as to restore a stable trajectory for a subset of the ions within the channels 116a,b. For example, in accordance with various aspects of the present teachings, the DC compensation field C for each of the channels 116a,b can be generated by selecting or tuning the DC voltage difference (i.e., the compensation voltage or CV) between the electrodes by increasing or decreasing the individual DC potentials applied to the electrode pair 112a,b and 112b,c respectively) so as to preferentially restore a stable trajectory to particular ions within each channel 116a,b. In this manner, the subset of the ion species within each channel 116a,b having a stable trajectory within the combination of the asymmetric separation field S and the DC compensation field C (e.g., at a particular combination of SV/CV) will be substantially transmitted along the z-direction of FIG. 1 and from the outlet 120 of the DMS 110 to the mass spectrometer 150 via its inlet 154.

Depending on the application, the particular SV/CV combination within each channel 116a,b can be selected to be different from one another such that only ion species exhibiting particular differential mobilities at each selected SV/CV combination are transmitted through the respective channels 116a,b to the outlet 120 of the differential mobility spectrometer 110 (while other species of ions are neutralized at one of the electrodes 112a-c). By way of example, in some applications the SVs within the two channels can be maintained substantially identical in magnitude, while the CVs between the respective electrode pairs 112a,b and 112b,c associated with each channel 116a,b can be set to different fixed values such that only ion species exhibiting a stable trajectory based on their particular differential mobilities at the particular SV/CV conditions associated with the channel 116a,b are transmitted therefrom. In some aspects, for example, optimum CV values (i.e., $CV_1$ and $CV_2$) for two or more ion species of interest can be determined at a common SV (e.g., theoretically or based on empirical data) and the $SV/CV_{1,2}$ combination within the upper and lower channels 116a,b can be set, respectively. The ion source 103 can then be activated such that a stream of sample ions enters the curtain gas chamber inlet 134 and is split between the two channels 116a,b, with the upper channel 116a transmitting to the outlet end 120 the subset of the sample ions stable under the $SV/CV_1$ combination applied to the electrodes 112a,b of the upper channel 116a, while the lower channel 116b transmits to the outlet end 120 a different subset of sample ions that are stable under the $SV/CV_2$ combination applied to electrodes 112b,c of the lower channel 116b. It will also be appreciated that in some applications, the CV associated with each channel 116a,b can be the same magnitude, while the SV associated with each channel 116a,b can be different such that each channel 116a,b selectively transmits ions stable under the respective $SV_{1,2}/CV$ combination. In some aspects, each of the asymmetric separation field S and the DC compensation field C can differ between the channels 116a,b. For example, the SV/CV combinations for the channels 116a,b can differ in both the magnitude of the CV and the magnitude of the SV (e.g., $SV_1/CV_1$ in channel 116a and $SV_2/CV_2$ in channel 116b, wherein $SV_1 \neq SV_2$ and $CV_1 \neq CV_2$). It will also be apparent that the S and C values can be different for the two channels 116a,b by maintaining $SV_1=SV_2$ and $CV_1=CV_2$, while providing for different gap heights between the electrodes associated with each channel 116a,b (i.e., $d_1$ $d_2$) and/or different pressures within the channels 116a,b (e.g., $P_1 \neq P_2$). It will also be appreciated in light of the present teachings that in some exemplary aspects of operating the DMS 110, both the S and C can be maintained identical in the two channels 116a,b (with identical gap heights and pressures therein) so as to transmit the same subset (e.g., selected species) of ions through each channel 116a,b.

In various aspects, the CV in each channel 116a,b can be ramped (e.g., scanned) during a sample run by changing the DC potential applied to one or more of the electrodes 112a-c of the electrode pairs 112a,b and 112b,c such that ion species exhibiting different ion mobilities can be transmitted by each channel 116a,b over the duration of the scan. By way of example, the CV in each channel 116a,b can be increased continuously or in a stepwise manner through the modification of the DC potential difference between the electrodes of each pair 112a,b and 112b,c under the influence of the controller 160. As will be appreciated by a person skilled in the art, the differential mobility spectrometer 110 can also operate in "transparent" mode, for example, by setting SV and CV to zero such that substantially all ions are transmitted therethrough without experiencing a net radial movement.

As noted above, the exemplary system 100 can additionally comprise a controller 160 for controlling operation thereof. By way of example, the controller 160 can include a processor for processing information. Controller 160 can also include data storage for storing mass spectra, data regarding optimum SV/CV combinations (e.g., in a database or library), and instructions to be executed by processor, etc. Data storage also may be used for storing temporary variables or other intermediate information during execution of instructions to be executed by the processor. The controller 160 can also be operatively associated with an output device such as a display (e.g., a cathode ray tube (CRT) or liquid crystal display (LCD), for displaying information to a computer user) and/or an input device including alphanumeric and other keys and/or cursor control, for communicating information and command selections to the processor. Consistent with certain implementations of the present teachings, the controller 160 can execute one or more sequences of one or more instructions contained in data storage, for example, or read into memory from another computer-readable medium, such as a storage device (e.g., a disk). Implementations of the present teachings are not limited to any specific combination of hardware circuitry and software.

Figure 2:
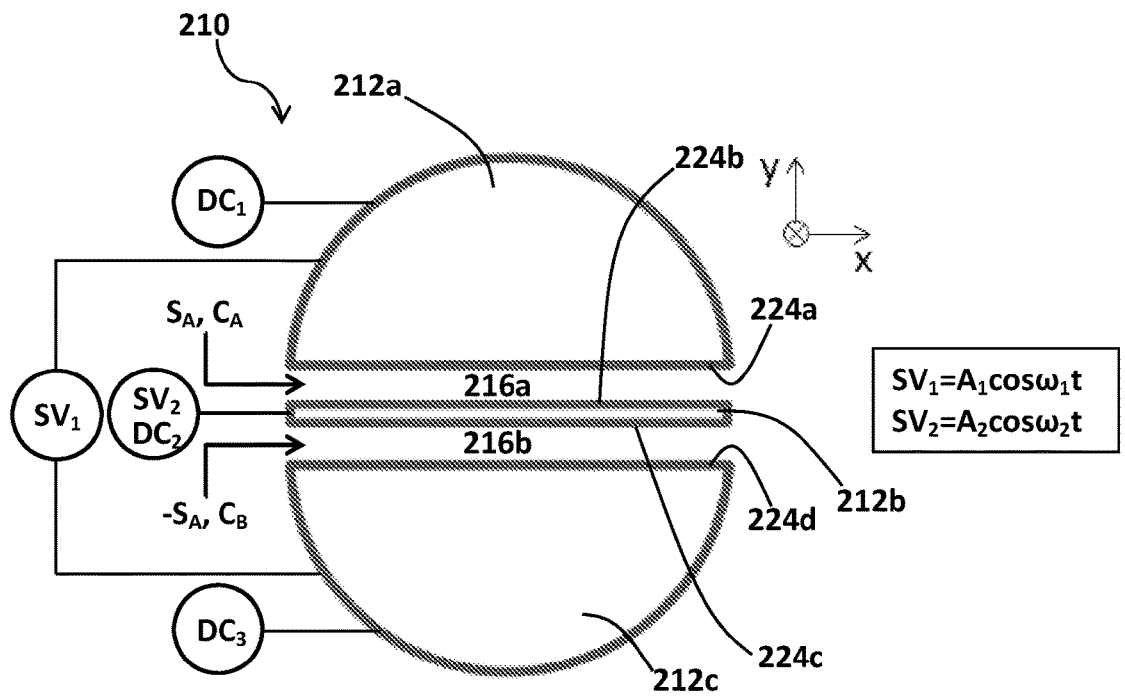
FIG. 2 depicts an exemplary differential mobility spectrometer having two channels and suitable for use in the system of FIG. 1 in accordance with various aspects of the present teachings.

With reference now to FIG. 2, an exemplary multi-channel differential mobility spectrometer suitable for use in the system 100 of FIG. 1 in accordance with various aspects of the present teachings is depicted in a view along the z-axis of FIG. 1 (the x-, y-, and z-axes are provided for orientation and ease of description and should not be considered limiting to the present teachings). As shown in FIG. 2, the exemplary DMS 210 includes three electrodes 212a-c spaced apart in the y-direction so as to define two channels 216a,b therebetween. Specifically, the DMS 210 includes an upper electrode 212a and an electrically conductive middle electrode 212b, each of which can be electrically coupled to one or more power supplies for generating a first differential mobility electric field within the channel 216a between the electrodes 212a,b. Additionally, the middle electrode 212b forms an electrode pair with an electrically conductive lower electrode 212c, which can also be electrically coupled to one or more power supplies (the same or different from the electrodes of the electrode pair 212a,b) such that a second differential mobility electric field can be generated within the gap 216b between the electrodes 212b,c.

It will be appreciated that the electrodes 212a-c can have a variety of shapes (e.g., semi-cylindrical, rectangular, and portions thereof) in accordance with the present teachings, and should not be limited to those exemplary shapes particularly depicted herein. As shown, however, each of the electrodes 212a,c comprise semi-cylindrical electrodes, each of which has a planar conductive surface 224a,d partially defining its associated channel 216a,b, respectively. Additionally, as shown in FIG. 2, the middle electrode 212b comprises a rectangular electrode having an upper planar surface 224b that is opposed to and parallel with the planar surface 224a of the upper electrode 212a to thereby define the channel 216a. Likewise, the middle electrode 212b includes a lower planar surface 224c that is opposed to and parallel with the planar surface of 224d of the lower electrode 212c so as to define the channel 216b therebetween.

As shown in FIG. 2, in some exemplary aspects the upper and lower electrodes 212a,c can be electrically coupled to the same power supply configured to provide a first separation electrical signal ($SV_1$), while the middle electrode 212b is electrically coupled to a different power supply for providing a second separation electrical signal ($SV_2$) that is different from the first separation electrical signal, the combination of these separation electrical signals resulting in an asymmetric waveform of the separation field $S_A$, the amplitude of which is generally referred to herein as a separation voltage (i.e., $SV_A$). Though the electrical signals applied to the electrodes 212a-c to generate the asymmetric field can comprise any of an AC, RF, squarewave or other time-varying signal in accordance with the various aspect of the present teachings, the exemplary first electrical signal ($SV_1$) applied to the electrodes 212a,c in FIG. 2 is a sinusoidal function $A_1 \cos \omega_1 t$, while the exemplary second electrical signal ($SV_2$) applied to the electrode 212b is a sinusoidal function of $A_2 \cos \omega_2 t$. In some exemplary aspects, the amplitude of $SV_1$ can be twice the amplitude of $SV_2$ (i.e., $A_1$ can be two times $A_2$) while the frequency of $SV_1$ can be half the frequency of $SV_2$ (i.e., $\omega 1$ is half $\omega_2$) so as to generate an exemplary asymmetric FAIMS waveform in accordance with various aspects of the present teachings. It will be appreciated by a person skilled in the art that the result of these two signals (i.e., $SV_1$ and $SV_2$) applied to the electrodes 212a-c results in an asymmetric separation field $\pm S_A$ within each respective channel 216a,b exhibiting a high-field portion and a low-field portion and exhibiting equal magnitudes at each point in time. The minus sign on $-S_A$ for the lower channel 216b merely indicates that the orientation of the asymmetric separation field in the lower channel 216b is in an opposite y-direction from that of the upper channel 216a based on the electrical coupling of the first and third electrode 212a,c and the application of identical electrical signals thereto. It will be appreciated by a person skilled in the art in light of the present teachings that S fields of opposite orientation can nonetheless be considered identical and can be accounted for, for example, by considering the direction of the DC compensation field C on the direction of the movement of the ions. Alternatively, it will be appreciated that by inverting the phase of the separation voltage signal applied to the third electrode 212c, the separation fields between the electrode pairs would have the same direction.

Additionally, as shown in FIG. 2 and discussed otherwise herein, each of the electrodes 212a-c can be coupled to a DC power supply that is configured to provide a DC electric potential thereto (e.g., $DC_1$, $DC_2$, $DC_3$, respectively). It will be appreciated in light of the present teachings that by selectively setting the DC potentials for each electrode, the DC compensation field (C) can be determined in each channel 216a,b based on the gap height and the difference in the DC potentials between the electrode pairs 212a,b and 212b,c respectively. As a result of the exemplary potentials applied to the respective electrodes 212a-c depicted in FIG. 2, ions within the respective channels 216a,b would be subjected to different differential mobility fields comprising identical separation fields $S_A$ and different compensation fields (i.e., $C_A$ and $C_B$). It should be noted that because two differential mobility fields consisting of a single separation field and two compensation fields of equivalent magnitude and opposite polarities could be effective to transmit different species of ions, it will be appreciated that the differential mobility fields generated by these two combinations are not considered equivalent within the meaning of the present disclosure. However, a person skilled in the art will appreciate that differential mobility fields can be considered equivalent to one within the meaning of the present teachings based on the magnitudes thereof as long as the respective orientations of the S and C remain consistent relative one another. For example, with reference to the channels 216a,b of FIG. 2, if the electrodes 212a-c were configured so as to generate $S_A$ and $C_A$ in channel 216a and $-S_A$ and $-C_A$ in channel 216b, the ions in each channel 216a,b would be subject to identical differential mobility fields within the meaning of the present teachings (ions of the same species would merely drift in opposite y-directions in each channel 216a,b). Similarly, if the electrodes 212a-c were configured so as to generate $S_A$ and $-C_A$ in channel 216a and $-S_A$ and $C_A$ in channel 216b, the ions in each channel 216a,b would again be subject to identical differential mobility fields within the meaning of the present teachings as the relative orientations and magnitudes of $S_A$ and $C_A$ remain consistent between the channels 216a,b.

Thus, in accordance with various aspects of the present teachings, $C_A$ (e.g., with $CV_A = DC_1 - DC_2$) and $C_B$ (e.g., with $CV_B = DC_2 - DC_3$) can be selected (e.g., tuned) for each channel 216a,b (e.g., by modifying at least one of $DC_1$, $DC_2$, and $DC_3$) so as to preferentially restore a stable trajectory to a different subset of the sample ions (e.g., different species having different differential mobility characteristics) within each channel 216a,b such that the selected ions will be transmitted along the z-direction with the drift gas without being neutralized at one of the electrodes associated with each channel 216a,b. It will be apparent to those of skill in the relevant arts that the middle electrode can be maintained at ground potential and the outer electrodes may have a FAIMS waveform applied to them, as well as a DC separation voltage, so that both the SV and CV can be controlled independently in each channel.

Figure 3:
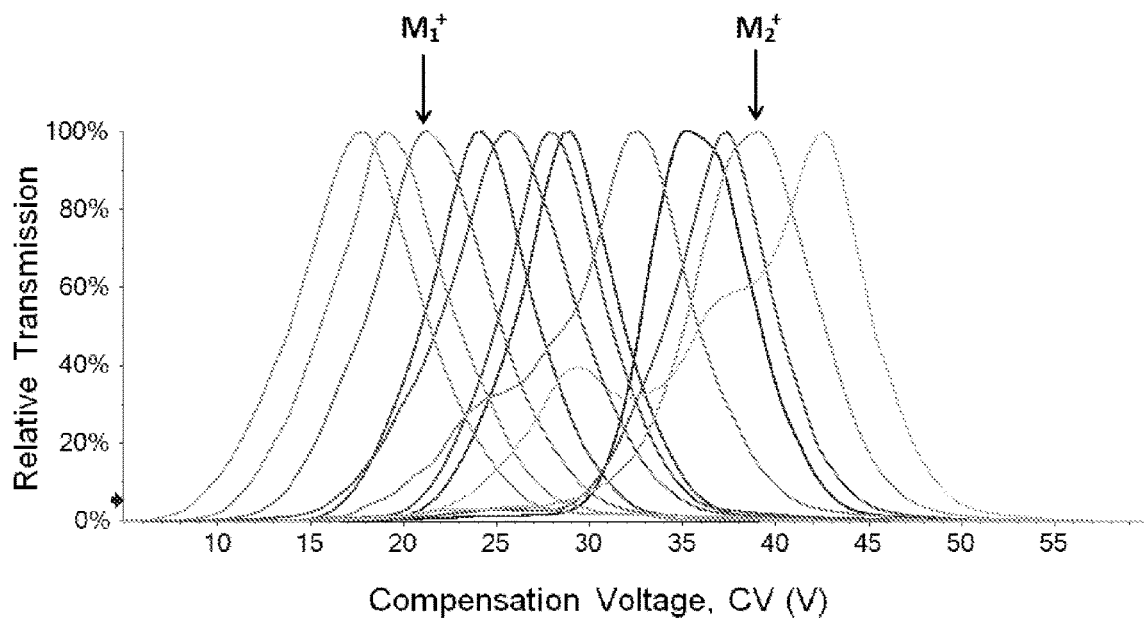
FIG. 3 depicts exemplary data regarding the relative intensity of a plurality of ions transmitted by a DMS at various CV values.
Figure 4:
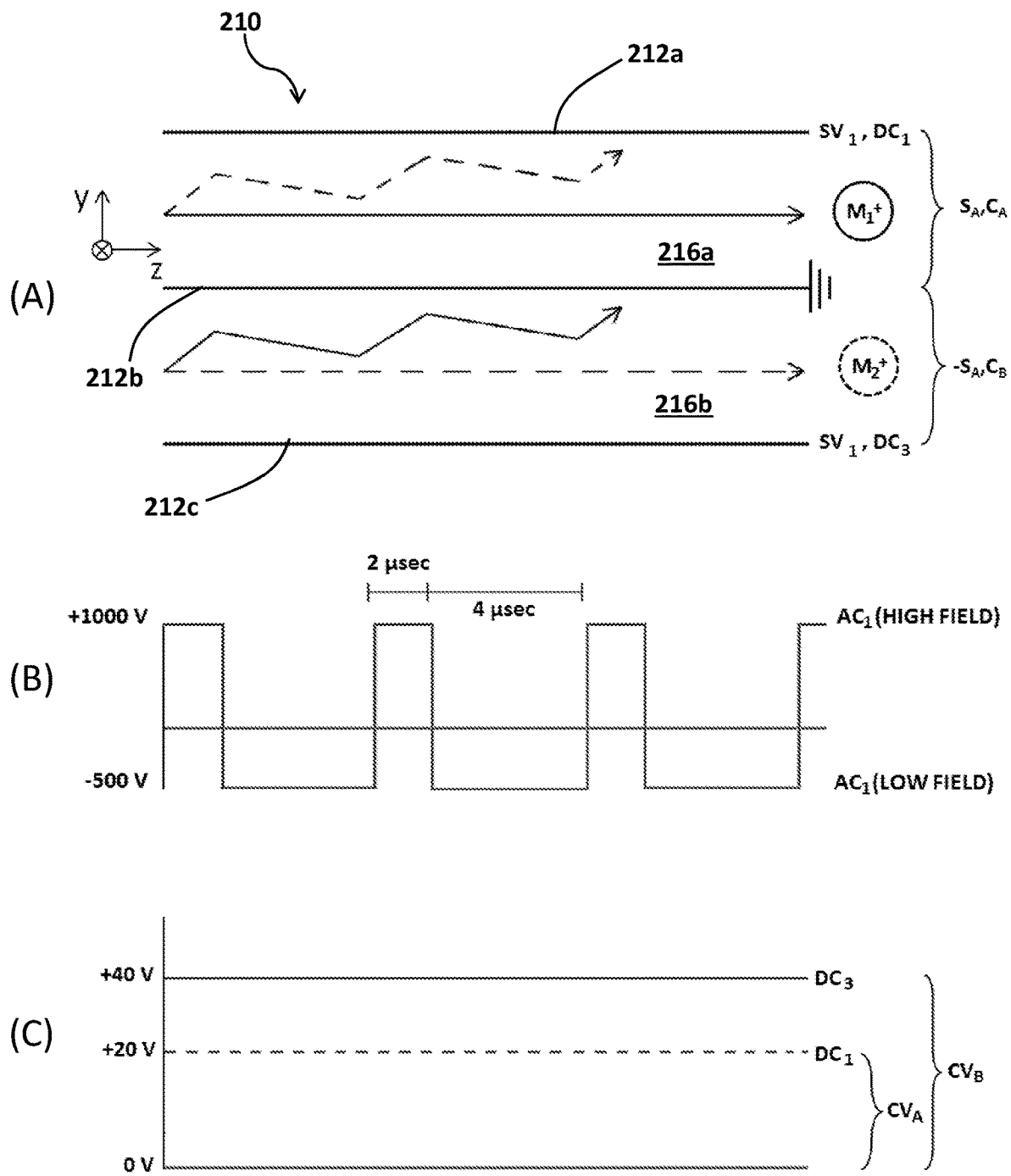
FIG. 4 depicts, in schematic diagram, paths for particular ions of FIG. 3 in the DMS of FIG. 2 based on the exemplary SV/CV timing diagrams.

With reference now to FIGS. 3 and 4, an exemplary method of analyzing a plurality of sample ions using the DMS 210 of FIG. 2 will be discussed. FIG. 3 depicts the normalized intensity of a plurality of sample ions (including the ion species of interest $M_1^+$ and $M_2^+$ that have the same polarity) at various CV values for a fixed time-varying separation voltage SV. As shown in FIG. 3, each of the sample ions exhibit peak ion intensity at a particular CV value (for the exemplary DMS conditions of a fixed time-varying separation voltage SV), with the ion species $M_1^+$ exhibiting a maximum relative intensity at CV=20 V DC and the ion species $M_2^+$ exhibiting a maximum relative intensity at CV=40 V DC. It will also be observed from the plot of FIG. 3 that there exists several ion species exhibiting peak intensities at CV values between the CV peaks for the ion species of interest. If using a conventional DMS system, it will be appreciated in light of the present teachings that filtering the ions of interest requires one or more of: i) different combinations of SV/CV to be applied iteratively (e.g., by generating a CV=20 V DC, filtering the sample ions, and performing any subsequent mass analysis prior to switching the CV to 40 V DC), ii) use of a single CV set at a value at which both ion species of interest would be transmitted (e.g., at CV=30 V DC, wherein each ion of interest exhibits a 10% relative transmission) and/or iii) an increase the drift gas flow rate such that more sample ions (of all species) would be transmitted by the DMS before being deflected into the electrodes. It will further be appreciated that each of these techniques utilizing a conventional DMS can suffer from decreased throughput, increased duty cycle, decreased sensitivity, and/or decreased resolution.

With specific reference now to FIG. 4, a cross-sectional side view of the DMS 210 of FIG. 2 and an exemplary method of analyzing a plurality of sample ions using the same in accordance with various aspects of the present teachings is schematically depicted. It will initially be noted with respect to FIG. 4B that the middle electrode 212b is grounded and that SV is depicted as a square waveform rather than as the AC signal (e.g., RF signal) as shown in FIG. 2 for ease of description. Nonetheless, it will be appreciated by a person skilled in the art that any of a time-varying SV waveform (e.g., sinusoidal, square waveform or other asymmetric fields in which the net time-varying voltage applied to the DMS electrodes is zero during each cycle of the SV). With reference still to FIG. 4B, a plot of exemplary, time-varying, RF, and/or asymmetric electrical voltages to be applied to the various electrodes 212a,c for generating an asymmetric separation field S is depicted. Specifically, the $AC_1$ signal comprises a square wave voltage having a total period of 6 μsec, in which the electric potential applied to the electrodes 212a,c is at +1000 V for 2 μsec and then at −500 V DC for 4 μsec. Although the waveform of FIG. 4B is depicted as a square-wave function with a total cycle time of 6 μsec and a net time-varying voltage of zero during each period, it will be apparent to those of skill in the relevant arts that other waveform shapes and periods are possible, including waveforms constructed by summation of two sine waves, by way of non-limiting example.

As discussed above, DC potentials can also be applied to the electrodes 212a-c, with the difference in DC potential between the pairs generating a counteracting electrostatic force to that of the SV within the channels 216a,b. As noted above, this DC compensation field (C) can be set to a different fixed value within each channel 216a,b so as to pass only ion species with a particular differential mobility at the applied combination of SV/CV, while the remaining species of ions drift toward the electrodes 212a-c and are neutralized thereat, as shown schematically in FIG. 4A. Specifically, FIG. 4C depicts a plot of the exemplary DC electrical signals $DC_1$ and $DC_3$ that are applied to the filter electrodes 212a,c (electrode 212b is grounded) so as to set $CV_A$=20 V DC in channel 216a and $CV_B$=40 V DC in channel 216b. With reference now to FIG. 4A, the combined effect of the electric fields generated by the waveforms in FIGS. 4B and 4C is shown in schematic representation for the two ion species of interest. In the upper channel 216a, for species $M_2^+$, the ion's mobility in the asymmetric electric field $S_A$ indicates a net movement 103 towards the upper electrode 212a of the DMS 110 upon injection. However, for the ion species ($M_1^+$), the +20 V $CV_1$ in channel 216a maintains the $M_1^+$ ion species along a safe trajectory through the DMS 110 (i.e., without striking one of the filter electrodes 212a,b). Similarly, in the lower channel 216b in which $CV_2$ is set to the maximum transmission for species $M_2^+$, the trajectory of the $M_1^+$ ion is not stable at the $SV_1/CV_2$ and is neutralized at the electrode 212b, while the $M_2^+$ ion can be transmitted through the channel 216b to the outlet of the DMS 210. As discussed above, it will be appreciated by a person skilled in the art in light of the present teachings that S and C fields of opposite orientation (i.e., $\pm S_A$) can nonetheless be considered identical differential mobility fields (i.e., identical SV/CV combinations) within the present teachings in that the orientation of the SV/CV combination remains consistent between the channels. That is, if a +20 V signal were instead applied to electrode 212c of FIG. 4A, the net motion of the $M_2^+$ ion would be in the −y-direction (i.e., the mirror image of the schematic motion of $M_2^+$ in channel 216a).

In this manner, it will be appreciated that systems and methods for simultaneously filtering selected subsets of sample ions based on their characteristic ion mobilities' under the particular SV/CV conditions to which the subsets of ions are subjected can provide relative to conventional DMS systems one or more of the following: i) improved duty cycle by eliminating the need to switch the CV or SV during a particular sample run, ii) increased throughput by reducing the data acquisition time, iii) decreased sample consumption by reducing the length of the sample analysis, iv) increased sensitivity and/or resolution by operating the DMS channels at more optimal conditions for each particular ion species of a plurality of ions species of interest having different mobility characteristics.

With reference again to FIGS. 3 and 4, it will be appreciated that the exemplary multi-channel DMS 210 can also be configured to operate such that a single SV/CV combination can be simultaneously generated within each channel 212a,b such that all sample ions entering the inlet end of the multi-channel DMS 210 would be subject to identical differential mobility electric fields (e.g., an identical SV/CV combination) during transmission through the DMS 210. By way of example, if one wished to only transmit ion species $M_1^+$ during a certain time period (e.g., at a certain LC elution time there is only a single ion of interest), the electrical signals provided to the electrodes 212a-c can be adjusted (e.g., via a controller) such that the same field would be generated within the channels 216a,b. With specific reference to FIG. 4A, for example, the $DC_3$ could be switched to be equal to $DC_1$ such that the DC potential difference (CV) between the electrodes of each pair 212a,b and 212b,c are identical at CV=+20 V DC such that ion species $M_1^+$ would be selectively transmitted from each of channels 216a,b.

Figure 5:
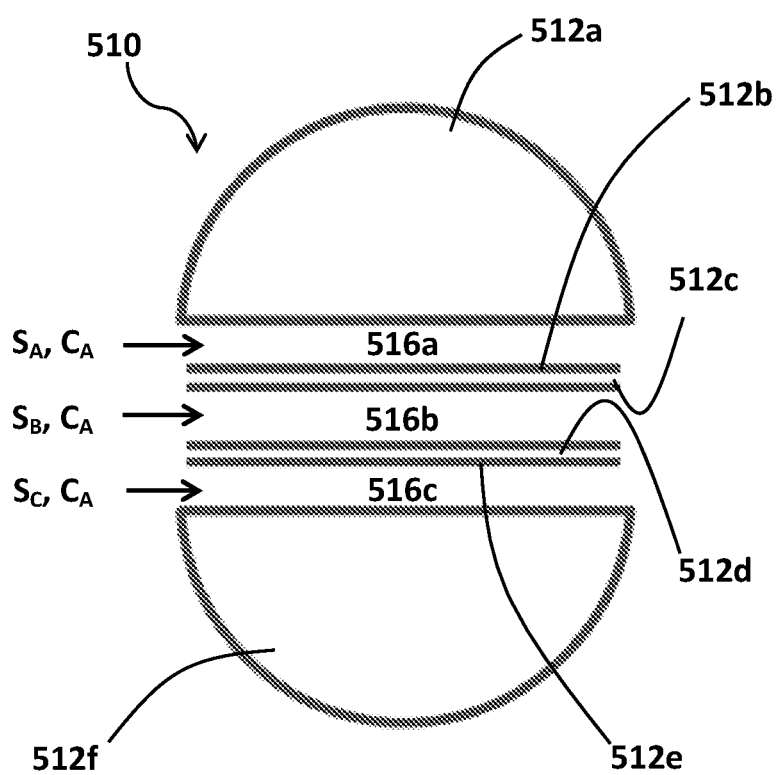
FIG. 5 depicts an exemplary differential mobility spectrometers having three channels and suitable for use in the system of FIG. 1 in accordance with various aspects of the present teachings.

With reference now to FIG. 5, another exemplary multi-channel differential mobility spectrometer 510 suitable for use in the system 100 of FIG. 1 in accordance with various aspects of the present teachings is depicted in a view along the z-axis of FIG. 1. The DMS 510 is similar to DMS 210 depicted in FIG. 2 but differs in that DMS 510 includes six electrodes 512a-f so as to define three channels 516a-c therebetween. As shown in FIG. 5, rather than the channels sharing an electrode (e.g., electrode 212b in FIG. 2), the electrodes associated with different channels can be electrically isolated from another. By way of example, an electrical isolation layer can extend between the electrodes 512b,c such that different electrical signals can be applied thereto. As discussed otherwise herein, each of the electrodes 512a-f can be electrically coupled to one or more power supplies for generating a different differential mobility electric field within each channel 516a-c such that different subsets of sample ions within each channel can be transmitted based on their mobility characteristics within the particular SV/CV combination generated in each channel between the associated, opposed electrode pairs.

Figure 6:
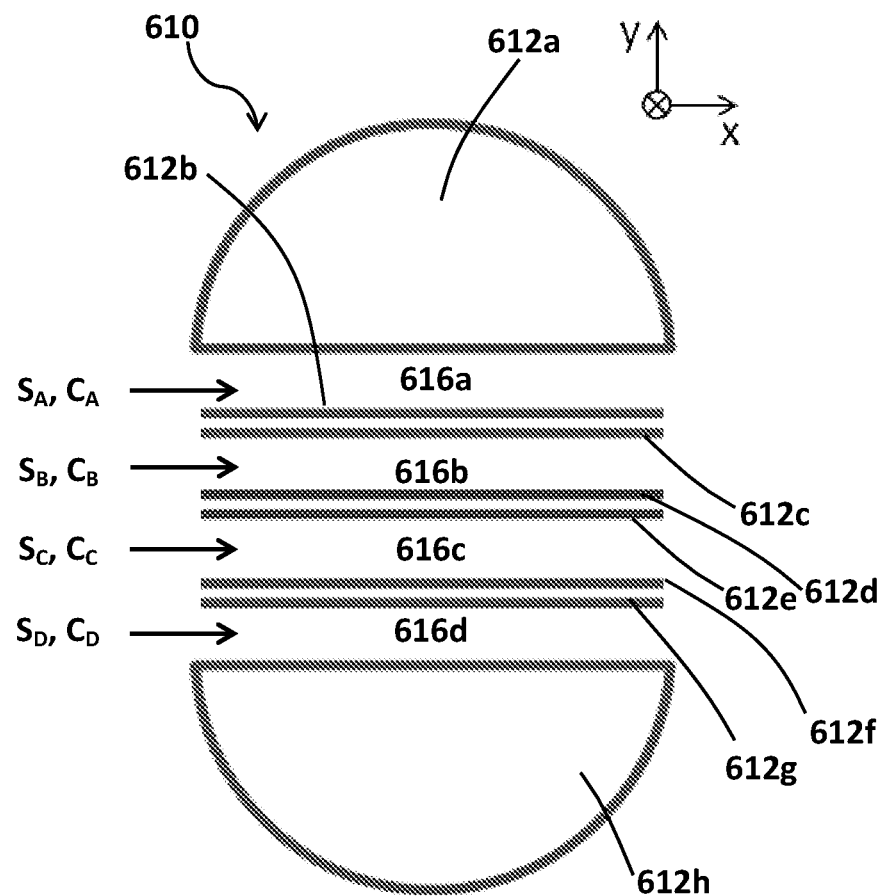
FIG. 6 depicts an exemplary differential mobility spectrometers having four channels and suitable for use in the system of FIG. 1 in accordance with various aspects of the present teachings.

Rather than generating different compensation fields C and maintaining identical separation fields S in each channel as depicted in FIG. 2, FIG. 5 schematically depicts an alternative method for providing different SV/CV combinations to multiple channels in accordance with various aspects of the present teachings. Specifically, as shown in FIG. 5, the compensation fields (i.e., $C_A$) within each channel 516a-c of DMS 510 are identical, for example, by applying DC electrical signals to each of the electrodes associated with each channel such that the DC potential difference between the electrodes of each pair is constant. On the other hand, each of $SV_{A-C}$ generated in the channels 316a-c, respectively, can differ from one another by coupling the electrodes 512a-f to a power system configured to apply a first time-varying separation electrical signal $AC_1$ to the first electrode 512a, a second time-varying separation electrical signal $AC_2$ to the second electrode 512b, a third time-varying separation electrical signal $AC_3$ to the third electrode 512c, and a fourth time-varying separation electrical signal $AC_4$ to the fourth electrode 512d, a fifth time-varying separation electrical signal $AC_5$ to the fifth electrode 512e, and a sixth time-varying separation electrical signal $AC_6$ to the sixth electrode 512f. Thus, the CV within each of the channels 516a-c is set to the same value, while the SV exhibits different magnitudes based on the combinations of $(AC_2-AC_1)$, $(AC_4-AC_3)$, and $(AC_6-AC_5)$ such that each channel 516a-c selectively transmits ions stable under the respective $SV_{1-3}/CV_1$ combination With reference now to FIG. 6, another exemplary multi-channel differential mobility spectrometer 610 suitable for use in the system 100 of FIG. 1 in accordance with various aspects of the present teachings is depicted in a view along the z-axis of FIG. 1. The DMS 610 is similar to DMS 210 and DMS 510 of FIGS. 2 and 5, respectively, but differs in that DMS 610 includes eight electrodes 612a-h so as to define four channels 616a-d therebetween. As shown in FIG. 6, the electrodes associated with the different channels can be electrically isolated from another (e.g., there is an insulator between 612b and 612c). As discussed otherwise herein, each of the electrodes 612a-h can be electrically coupled to a power system for generating a time-varying electric field within each channel 616a-d such that various subsets of sample ions within each channel can be transmitted based on their mobility characteristics within the particular SV/CV combination generated in each channel between the associated, opposed electrode pairs. FIG. 6 schematically depicts an additional exemplary method for providing different SV/CV combinations to multiple channels in accordance with various aspects of the present teachings. Specifically, as shown in FIG. 6, the CVs within each channel 616a-d of DMS 610 are varied (i.e., $C_{A-D}$) by selectively setting the DC potentials for each electrode, wherein the DC compensation field ($C_{A-D}$) is determined in each channel 616a-d based on the difference in the DC potentials between the electrode pairs 612a,b, 612c,d, 612e,f, and 612g,h, respectively. Additionally, each of $S_{A-D}$ generated in the channels 616a-d can differ from one another by coupling the electrodes 612a-h to a power system configured to apply different separation electrical signals to the electrodes 612a-h. Thus, the combination of S/C differs for each channel 616a-d relative to the other channels such that different subsets of sample ions can be transmitted from each of the channels of the DMS 610.

Figure 7B:
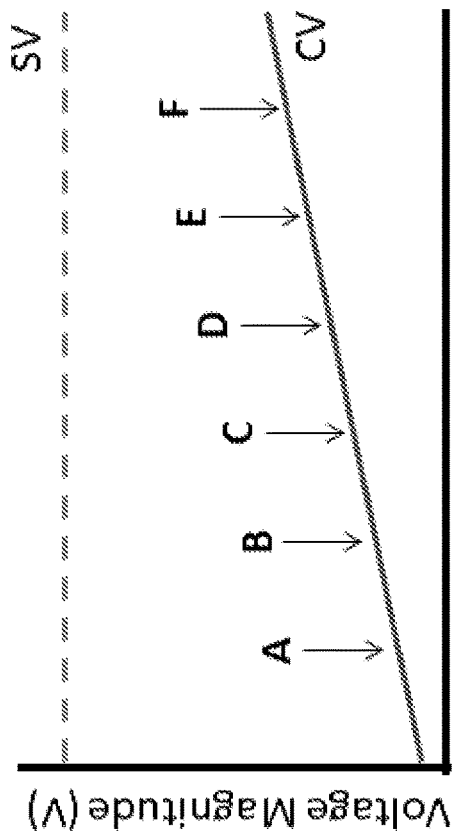
FIGS. 7A-C depict another exemplary multi-channel differential mobility spectrometer in accordance with various aspects of the present teachings and various exemplary methods for operating the same.
Figure 7C:
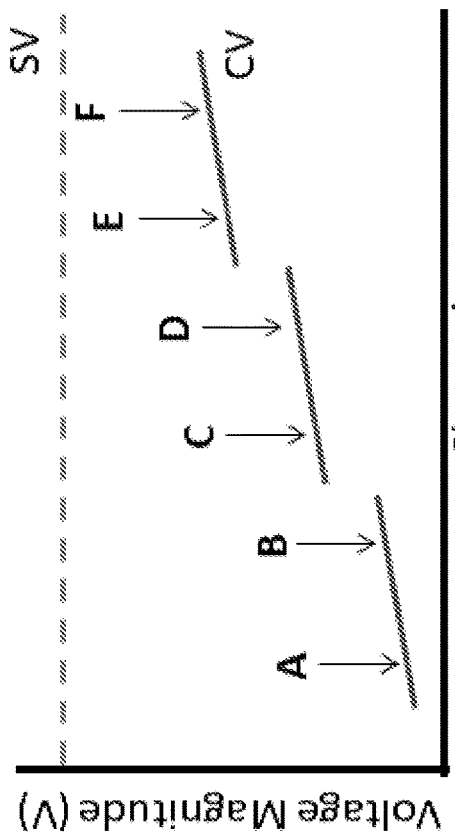
Figure 7A:
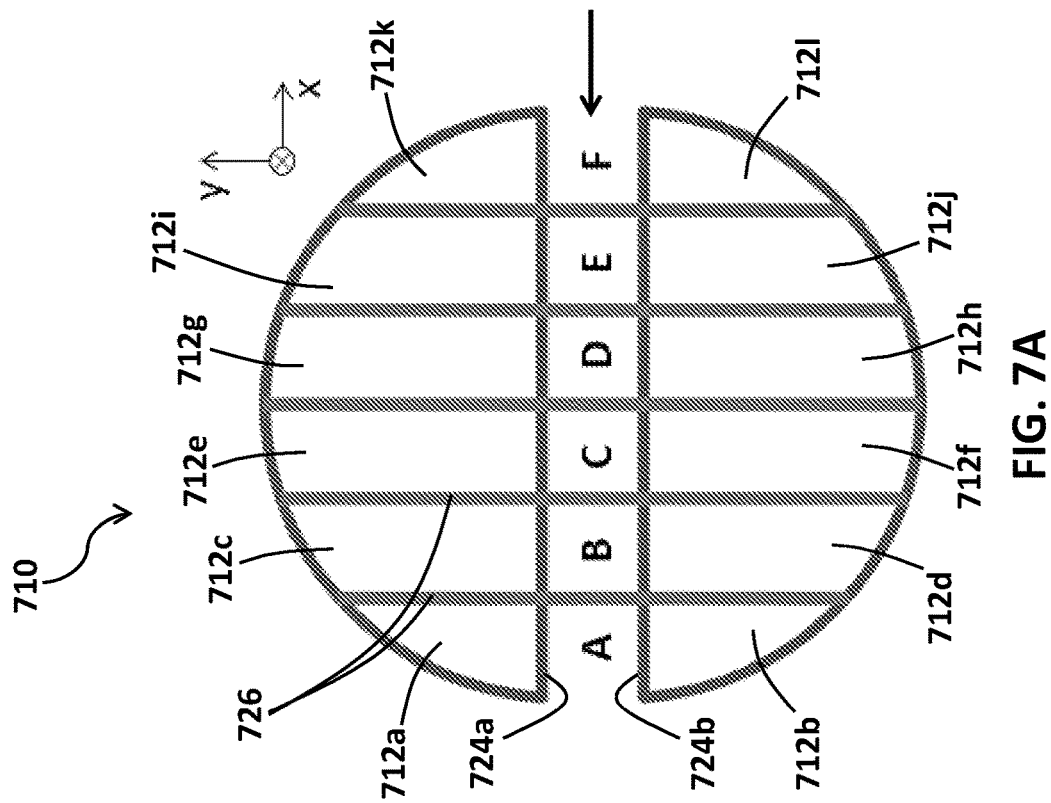

With reference now to FIGS. 7A-C, another exemplary multi-channel differential mobility spectrometer 710 and exemplary methods for operating the same in accordance with various aspects of the present teachings are depicted. As shown in FIG. 7A, the DMS 710 includes a plurality of electrodes 712a-1 arranged in six electrode pairs (i.e., 712a, b, 712c,d, etc.) to define six channels therebetween and within which six different CVs (i.e., $CV_{A-F}$) can be generated in combination with identical SVs (i.e., six SV/CV combinations) so as to selectively transmit in parallel six different subsets of sample ions based on the ions' mobilities at each combination of SV and $CV_{A-F}$.

As shown, each of the electrodes 712a-1 of the electrode pairs comprise a planar, conductive surface 724a disposed in a parallel, facing relationship across the gap 716 from the planar, conductive surface 724b of the other electrode in its pair. As such, the planar surface 724a of the electrode 712a is coplanar with the planar surface of each of the other electrodes 712c,e,g,i,k disposed on the same side of the gap 716. Similarly, the planar surface 724b of the electrode 712b is coplanar with the planar surface of each of the other electrodes 712d,f,h,j,k disposed on the same side of the gap 716 as electrode 724b. Additionally, as shown in FIG. 7, each of the electrodes are separated by a separator 726 so as to electrically insulate adjacent electrodes of different electrode pairs from one another such that different electrical signals can be applied thereto in accordance with various aspects of the present teachings. Because of the differential in electric potential caused by the CVs applied between the adjacent pair of electrodes (i.e., $CV_{A-F}$), the separators 726 can be effective to prevent ions from one channel from migrating into the adjacent channels. With reference now to FIGS. 7B and 7C, it will be appreciated that the field magnitude of the $CV_{A-F}$ for each channel can be selected, for example, such that the various channels of the DMS 610 simultaneously transmit different subsets of sample ions as if the CV in a conventional, single-channel DMS were having its CV scanned in a continuous (as in FIG. 7B) or stepwise fashion (as in FIG. 7C), with the ACV between adjacent channels being constant or variable.

Figure 8B:
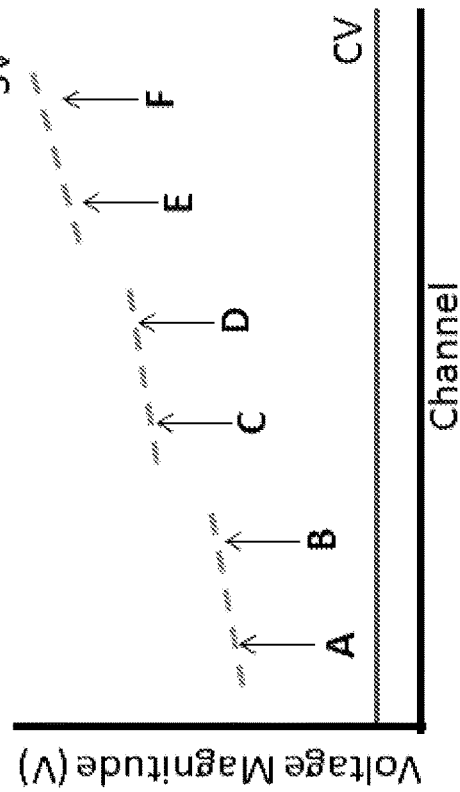
FIGS. 8A-C depict another exemplary multi-channel differential mobility spectrometer in accordance with various aspects of the present teachings and various exemplary methods for operating the same.
Figure 8C:
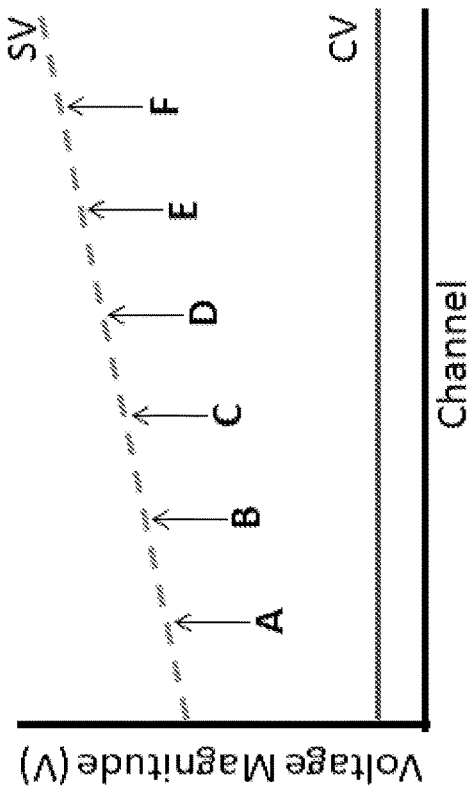
Figure 8A:
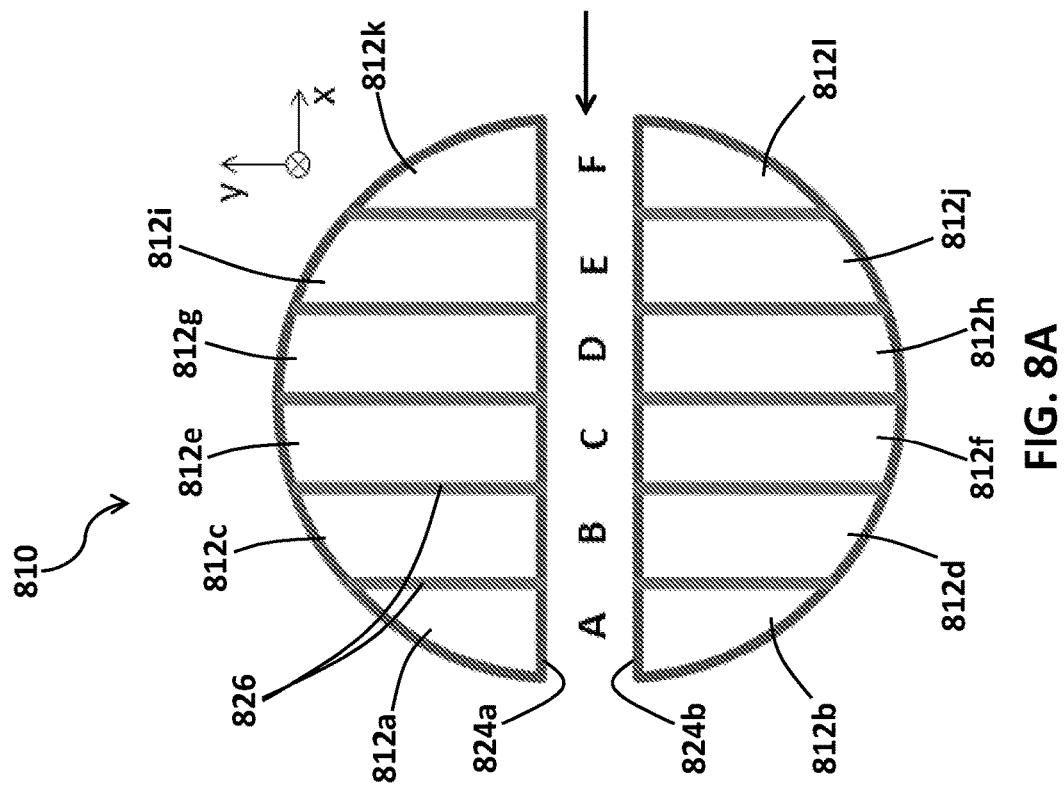

With reference now to FIG. 8A-C, another exemplary multi-channel differential mobility spectrometer 810 and exemplary methods for operating the same in accordance with various aspects of the present teachings are depicted. The DMS 810 is similar to DMS 710 in that it includes a plurality of electrodes 812a-1 also arranged in six electrode pairs (i.e., 812a,b, 812c,d, etc.) so as to define six channels therebetween and within which six different SVs can be generated in combination with an identical CV (i.e., six SV/CV combinations). As discussed otherwise herein, the six SV/CV combinations generated within the DMS 810 can enable six different subsets of sample ions to be selectively transmitted in parallel based on the ions' mobilities at each combination (i.e., $SV_{A-F}/CV$). While each of the electrodes on each side of the gap 816 are also separated by a separator 826 as discussed above with reference to FIG. 7, it need not be necessary in the exemplary method depicted in FIGS. 8B and/or 8C to have the separators 826 extend across the gap 816 as each of the different time-varying $SV_{A-F}$ generated in the channels should nonetheless net to an average voltage of zero volts for each period.

Though FIGS. 7B, 7C, 8B, and 8C demonstrate maintaining one of SV and CV fixed across all channels while adjusting the other of SV and CV, it should be appreciated that both the SV and CV within each channel A-F of DMS 710 and 810 can differ relative to the SVs and CVs of the other channel. As noted above, in such aspects it may be preferable for the separators to extend across the gap as in FIG. 7A.

It should be appreciated that numerous changes can be made to the disclosed embodiments without departing from the scope of the present teachings. For instance, the magnitude of the asymmetric field (S) can be varied by changing the gap height or the pressure within different channels in addition to just changing the SV magnitude. While the foregoing figures and examples refer to specific elements, this is intended to be by way of example and illustration only and not by way of limitation. It should be appreciated by the person skilled in the art that various changes can be made in form and details to the disclosed embodiments without departing from the scope of the teachings encompassed by the appended claims.

The invention claimed is:

1. A differential mobility spectrometer, comprising:
a plurality of electrodes extending from an inlet end for receiving sample ions contained within a drift gas to an outlet end for transmitting at least a portion of said sample ions, the inlet end positioned to receive ions from an orifice that is defined in a boundary member, wherein said plurality of electrodes comprise:
   a first pair of opposed filter electrodes extending from the inlet end to the outlet end and configured to receive a first portion of the sample ions therebetween, wherein the first pair of opposed filter electrodes is configured to be electrically coupled to a power supply so as to generate a first differential mobility electric field between the first pair of opposed filter electrodes; and
   a second pair of opposed filter electrodes extending from the inlet end to the outlet end and configured to a second portion of the sample ions therebetween, wherein the second pair of opposed filter electrodes is configured to be electrically coupled to the power supply so as to generate a second differential mobility electric field between the second pair of opposed filter electrodes,
wherein the first differential mobility electric field and the second differential mobility electric field are configured such that the first pair of electrodes and the second pair of electrodes transmit to the outlet end selected portions of the sample ions having different mobility characteristics,
wherein the first and second pair of opposed filter electrodes define first and second channels extending along the length of the plurality of electrodes, the first and second channels being separated from one another to prevent gas flow and ions from exchanging between the first and second channels and wherein the orifice at least partially overlaps an entrance of each of the first and second channels, wherein the first differential mobility electric field is generated in the first channel and the second differential mobility electric field is generated in the second channel, and
each filter electrode comprises a planar conductive surface partially defining at least one of the channels, wherein the planar conductive surfaces of the electrodes in each pair are parallel to one another;
where the power supply is configured to provide electrical signals to each of the opposed filter electrodes of each of the first and second pair such that each of the first and second differential mobility electric fields comprise a combination of an asymmetric separation field and a DC compensation field;
wherein the asymmetric separation fields are generated by applying different time-varying separation electrical signals to the opposed filter electrodes of each pair, wherein a first time-varying electrical signal is applied to one of the opposed filter electrodes of each pair and a second different time-varying electrical signal is applied to the other of the opposed filter electrodes of each pair;
wherein the different time-varying separation electrical signals comprise RF signals of different magnitude and frequency; and
wherein the amplitude of the first time-varying separation electrical signal is twice the amplitude of the second time-varying separation electrical signal and the frequency of the first time-varying separation electrical signal is half the frequency of the second time-varying separation electrical signal.

2. The differential mobility spectrometer of claim 1, wherein the first and second differential mobility electric fields differ from one another in at least one of the asymmetric separation field, the DC compensation field, the gap height, and the gas number density or pressure.

3. The differential mobility spectrometer of claim 2, wherein the first and second differential mobility electric fields comprise identical DC compensation fields and different asymmetric separation fields.

4. The differential mobility spectrometer of claim 1, wherein the DC compensation fields are generated by maintaining a DC compensation voltage differential between the opposed filter electrodes of each of the first and second pair.

5. The differential mobility spectrometer of claim 4, wherein the DC voltage differential between the opposed filter electrodes of the first pair is different from the DC voltage differential between the opposed filter electrodes of the second pair.

6. The differential mobility spectrometer of claim 1, wherein the first and second pair of opposed filter electrodes share an electrode.

7. The differential mobility spectrometer of claim 1, wherein the planar conductive surface of each electrode of the first and second pair is coplanar with the planar conductive surface of an electrode in the other of said first and second pairs.

8. The differential mobility spectrometer of claim 7, wherein the coplanar conductive surfaces of the electrodes are electrically isolated from one another.

9. The differential mobility spectrometer of claim 1, wherein the planar conductive surface of each filter electrode is parallel to the planar conductive surfaces of the other filter electrodes.

10. The differential mobility spectrometer of claim 9, wherein the first and second channels are separated by a filter electrode shared between the first and second pair, wherein the shared filter electrode comprises two parallel conductive surfaces, each of which partially defines one of the first and second channels.

11. The differential mobility spectrometer of claim 1, further comprising a third pair of opposed filter electrodes extending from the inlet end to the outlet end, wherein the third pair of opposed filter electrodes is configured to be electrically coupled to the power supply so as to generate a third differential mobility electric field between the third pair of opposed filter electrodes.

12. The differential mobility spectrometer of claim 11, wherein each filter electrode comprises a planar conductive surface parallel to the planar conductive surface of the other electrode in its pair, wherein the planar conductive surface of each electrode of the first, second, and third pair is coplanar with the planar conductive surface of an electrode in the other of said first, second, and third pair.

13. A mass spectrometer system comprising:
an ion source configured to generate a plurality of sample ions;
a differential mobility spectrometer of claim 1;
a mass analyzer disposed downstream from the differential mobility spectrometer and configured to mass analyze the ions transmitted thereby;
a detector;

a power system comprising one or more power supplies electrically coupled to the differential mobility spectrometer; and a controller for controlling said one or more power supplies so as to generate first and second differential mobility electric fields between pairs of opposed filter electrodes of the differential mobility spectrometer, wherein the first differential mobility electric field and the second differential mobility electric field are different so as to selectively transmit a plurality of selected portions of the sample ions based on the mobility characteristics thereof.

14. A method of analyzing ions comprising:

simultaneously generating first and second differential mobility electric fields between pairs of opposed filter electrodes of the differential mobility spectrometer of claim 1 so to selectively transmit in parallel a plurality of selected portions of the sample ions based on the mobility characteristics thereof.

* * * * *